United States Patent
Okaki et al.

(10) Patent No.: US 7,451,341 B2
(45) Date of Patent: Nov. 11, 2008

(54) STORAGE SYSTEM AND COMMUNICATIONS PATH CONTROL METHOD FOR STORAGE SYSTEM

(75) Inventors: Takuya Okaki, Ooiso (JP); Hirofumi Nakamura, Odawara (JP); Hironori Dohi, Odawara (JP); Masayuki Tanabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 591 days.

(21) Appl. No.: 10/994,339

(22) Filed: Nov. 23, 2004

(65) Prior Publication Data

US 2006/0075156 A1 Apr. 6, 2006

(30) Foreign Application Priority Data

Oct. 6, 2004 (JP) ............................. 2004-293229

(51) Int. Cl.
G06F 11/00 (2006.01)
(52) U.S. Cl. ........................................................ 714/4
(58) Field of Classification Search ...................... 714/4
See application file for complete search history.

(56) References Cited

U.S. PATENT DOCUMENTS

| | | | |
|---|---|---|---|
| 6,526,521 B1 * | 2/2003 | Lim ............................. | 714/4 |
| 6,601,195 B1 * | 7/2003 | Chirashnya et al. ........... | 714/43 |
| 6,769,071 B1 * | 7/2004 | Cheng et al. .................. | 714/4 |
| 7,143,153 B1 * | 11/2006 | Black et al. ................. | 709/223 |
| 2004/0078632 A1 * | 4/2004 | Infante et al. ................. | 714/5 |
| 2005/0114728 A1 * | 5/2005 | Aizawa et al. ................. | 714/6 |
| 2005/0120259 A1 * | 6/2005 | Aoki ............................. | 714/5 |

FOREIGN PATENT DOCUMENTS

JP 2002-278909 3/2001

OTHER PUBLICATIONS

"Improved Communication Availability by Controlling Retry Counts and Times", IBM Technical Disclosure Bulletin, Dec. 1991, US, vol. 34, iss 7a, pp. 77-79.*

* cited by examiner

*Primary Examiner*—Gabriel L Chu
(74) *Attorney, Agent, or Firm*—Reed Smith LLP; Stanley P. Fisher, Esq.; Juan Carlos A. Marquez, Esq.

(57) ABSTRACT

A method for controlling communications paths in a storage system provided between a storage device and a plurality of host devices. The method includes: respectively monitoring communications statuses between each of the host devices and the storage device; detecting whether a prescribed temporary failure, which can be corrected without switching communications paths, has occurred, based upon the detected communications statuses; a switching instruction step of not outputting a switching request signal for requesting switching from a failed communications path to a to-be-used communications path, before a number of occurrence of the prescribed temporary failure thus detected reaches a threshold value which is equal to or larger than 2, and outputting the switching request signal only when the number of occurrence of the prescribed temporary failure reaches the threshold value; and selecting the to-be-used communications path, from among the plurality of communications paths, on the basis of the switching request signal.

20 Claims, 14 Drawing Sheets

FIG. 4

| PATH MANAGEMENT INFORMATION | | | |
|---|---|---|---|
| MAIN | PATH #PA1 | LU #1 | NORMAL |
| SECONDARY | PATH #PA2 | LU #1 | ERROR STATUS |

| INTERMITTENT FAILURE MANAGEMENT TABLE (HOST A) | | |
|---|---|---|
| ERROR TYPE | NUMBER OF OCCURRENCES | THRESHOLD VALUE |
| COMMAND ABORT PROCESS | N1 | Th1 |
| RESET PROCESS | N2 | Th2 |
| COMMUNICATIONS TIME - OUT | N3 | Th3 |
| ABNORMALITY IN COMMUNICATIONS SIGNAL | N4 | Th4 |
| DECLINE IN RESPONSIVENESS | N5 | Th5 |
| ... | ... | ... |

T2A, T2B (INTERMITTENT FAILURE MANAGEMENT TABLE (HOST B)), T2C (INTERMITTENT FAILURE MANAGEMENT TABLE (HOST C))

STORAGE SYSTEM AND COMMUNICATIONS PATH CONTROL METHOD FOR STORAGE SYSTEM

CROSS-REFERENCE TO RELATED APPLICATIONS

This application relates to and claims priority from Japanese Patent Application No. 2004-293229 filed on Oct. 6, 2004, the entire disclosure of which is incorporated herein by reference.

BACKGROUND OF THE INVENTION

The present invention relates to a storage system and a communications path control method for a storage system.

The storage system comprises at least one or more host computer (hereinafter, called "host") and storage device, and the host and storage device are connected by means of communications cables, switches, and the like. This storage device provides a storage region based on a RAID (Redundant Arrays of Inexpensive Disks) system, wherein disk drives, such as hard disk drives, or the like, are arranged in an array configuration. The host accesses the logical storage region provided by the storage device and reads or writes data.

In the storage system, in order to achieve high availability, data is stored in a redundant fashion and a plurality of communications paths are prepared. A storage system is also known wherein, if a failure has occurred in a communications path, that failure is detected and the path is automatically switched to a spare communications path (Japanese Patent Laid-open No. 2002-278909).

The technology in the reference patent uses redundant management paths in order to manage the status of the fabric switches and storage devices, and it switches path automatically. It does not control the communications path of the I/O network used to input and output data, but rather, switches to a spare management path when a failure is detected in the management path.

However, there are many different types of failures, and these can be divided broadly into two types of failures. One type of failure is a continuous failure which occurs over a relatively long period of time (a solid failure). The other type of failure is a temporary or intermittent failure which occurs over a relatively short period of time.

For example, in the event of a solid failure, such as a device fault or a cable disconnection, communications will be disabled over a long period of time, and therefore it is possible to switch to another communications path that is functioning normally. However, in the event of an intermittent failure, since communications functions are recovered after a short period of time, there is no particular need to switch to another communications path and it is possible to wait until the functions are recovered. If the path is switched each time there is an intermittent failure, which is a temporary occurrence, then path switching will be performed frequently and the performance of the storage system as a whole will decline.

However, even in the case of intermittent failures, if that intermittent failure continues for a long period of time, for example, then the host is not able to perform data input or output normally, with respect to the storage device, whilst the intermittent failure continues. Therefore, in some cases, the information processing services supplied to client terminals by the host may become affected.

Furthermore, if the communications ports of the storage device, or the like, are shared by a plurality of hosts, then if an intermittent failure occurs between the storage device and one of the hosts sharing a port, this may also affect the storage services provided to the other hosts that share that port.

In the conventional technology described in the reference patent, only solid failures are taken into account, and no consideration is given to intermittent failures where the path is not switched. Therefore, it is not able to respond to the problem of cases where an intermittent failure continues for a long period of time, or cases where the ports of a storage device are shared.

SUMMARY OF THE INVENTION

It is an object of the present invention is to provide a storage system and a communications path control method for a storage system, whereby it is possible to switch the communications path in accordance with the state of occurrence of a failure, even in the case of minor failures. It is an object of the present invention to provide a storage system and a communications path control method for a storage system, whereby it is possible to prompt switching of the path only to the host device related to a failure, when the communications path is switched due to a minor failure. It is an object of the present invention is to provide a storage system and a communications path control method for a storage system, whereby it is possible to switch the communications path in accordance with the state of occurrence of a minor failure, by means of a relatively simple composition. Further objects of the present invention will become apparent from the following description of the embodiments.

In order to achieve the aforementioned objects, the storage system according to the present invention comprises: a plurality of host devices, and a storage device connectable respectively to these host devices by means of a plurality of communications paths; a communications status monitoring section for respectively monitoring the communications statuses between each of the host devices and the storage device; a failure detecting section for detecting whether or not a prescribed minor failure has occurred, on the basis of at least the respective communications statuses detected by the communications status monitoring section; a switching instruction section for outputting a switching request signal for requesting switching of the communications path, on the basis of the state of occurrence of the prescribed minor failure detected by the failure detecting section; and a path control section for selecting the communications path to be used on the basis of a switching request signal from the switching instruction section.

Here, each host device is able to share a communications port of the storage device, and the failure detecting section may be composed in such a manner that it detects prescribed minor failures with respect to communications ports that are shared by the host devices. The prescribed minor failure is a temporary failure where there is a possibility of recovering communications, for example, and it includes, at the least, a communications time-out status.

The failure detecting section may judge that the prescribed minor failure has occurred in cases where a prescribed command has been issued by the host device, or cases where a prescribed status has been detected inside the storage device. For example, the failure detecting section may judge that the prescribed minor failure has occurred, in cases where at least one of a processing abort command and a reset command has been issued by the host device, or cases where at least one of a communications time-out status and an abnormal status of the communications signal is detected in the storage device.

The switching instruction section may output a switching request signal in response to access from a host device. For example, the switching instruction section may be composed in such a manner that it outputs the switching request signal in response to a write access or read access from the host device, and does not output the switching request signal in response to a status enquiry access from the host device.

Here, the switching request signal may be composed as a signal that only affects the host device related to the prescribed minor failure. In one example, it is possible to use a hardware error response as a switching request signal.

The switching instruction section may be composed in such a manner that it outputs a switching request signal in accordance with the type of the prescribed minor failure. For example, threshold values may be previously established respectively in association with each type of the prescribed minor failures, and the switching instruction section may detect the number of occurrences respectively for each type of the prescribed minor failures and output a switching request signal, if the number of occurrences for any one prescribed minor failure of these types of prescribed minor failures has reached the corresponding threshold value.

If the path control section detects the switching request signal, it may judge whether or not there exists an available communications path, and if it judges that an available communications path exists, then it may select that available communications path. Alternatively, if the path control section detects the switching request signal, then it may judge whether or not there exists an original communications path from which communications were switched on a previous occasion that the switching request signal was detected, and if it judges that there does exist an original communications path from which communications were switched due to detection of the switching request signal, then it may select that original communications path.

The communications status monitoring section, the failure detecting section and the switching instruction section may be provided within the storage device, and the path control section may be provided within the host device. The path control section may be provided in a relay device provided between the host device and the storage device. The failure detecting section may be provided in either the host device or the relay device.

The communications path control method for a storage system according to a further aspect of the present invention is a control method for communications paths in a storage system provided with a storage device connectable respectively to a plurality of host devices by means of a plurality of communications paths, in which the communications ports of the storage device can be shared by the respective host devices; comprising: a monitoring step of respectively monitoring the communications statuses between each of the host devices and the storage device; a failure detecting step of detecting whether or not a prescribed minor failure has occurred, on the basis of the respective communications statuses thus detected; a switching instruction step of outputting a switching request signal for requesting switching of the communications path, on the basis of the state of occurrence of the prescribed minor failure thus detected; and a path selecting step of selecting a communications path to be used from among a plurality of communications paths, on the basis of a switching request signal.

The storage device according to a further aspect of the present invention is a storage device connectable to at least one host device by means of a plurality of communications paths, comprising: a host interface control section for controlling communications with a host device; and a slave interface for controlling communications between a group of storage devices storing data used by the host device; wherein the host interface control section comprises: a communications status monitoring section for monitoring the status of communications with the host device; a failure detecting section for detecting whether or not a previously established prescribed minor failure has occurred, on the basis of the detected communications status; and a switching instruction section for outputting a switching request signal for requesting the host device to switch the communications path, on the basis of the detected state of occurrence of the prescribed minor failure.

The storage device according to a further aspect of the present invention is a storage device connectable to at least one host device by means of a plurality of communications paths, comprising: a host interface control section for controlling communications with a host device; a slave interface for controlling communications between a group of storage devices storing data used by the host device; and a memory shared by the host interface control section and the slave interface control section; and further comprising: a communications status monitoring section, realized by the host interface control section, for monitoring the status of communications with the host device; a failure detecting section, realized by the host interface control section, for counting the respective number of occurrences for each one of previously established types of prescribed minor failures, on the basis of the detected communications statuses, and storing the count numbers in the memory; a switching instruction section, realized by the host interface control section, for judging whether or not the number of occurrences for each one of the types of prescribed minor failures stored in the memory has reached respectively established threshold values, and storing flag information for returning a hardware error response to the host device in the memory, if the number of occurrences has reached the corresponding threshold value; and an access processing section, realized by the host interface control section, for referring to the memory and judging whether or not the flag information has been stored, upon receiving either a write access or a read access from the host device, and for returning the hardware error response to the host device if the flag information has been stored.

At least a portion of the means, functions and steps according to the present invention may be constituted by computer programs which are read in and executed by a microcomputer. Computer programs of this kind may be distributed by copying them onto a storage medium, such as a hard disk, optical disk, or the like. Alternatively, computer programs may also be supplied via a communications network, such as the Internet.

BRIEF DESCRIPTION OF THE DRAWINGS

FIG. 4 is an illustrative diagram showing one example of path management information;

FIG. 5 is an illustrative diagram showing one example of an intermittent failure management table;

DESCRIPTION OF THE SPECIFIC EMBODIMENTS

Figure 1:
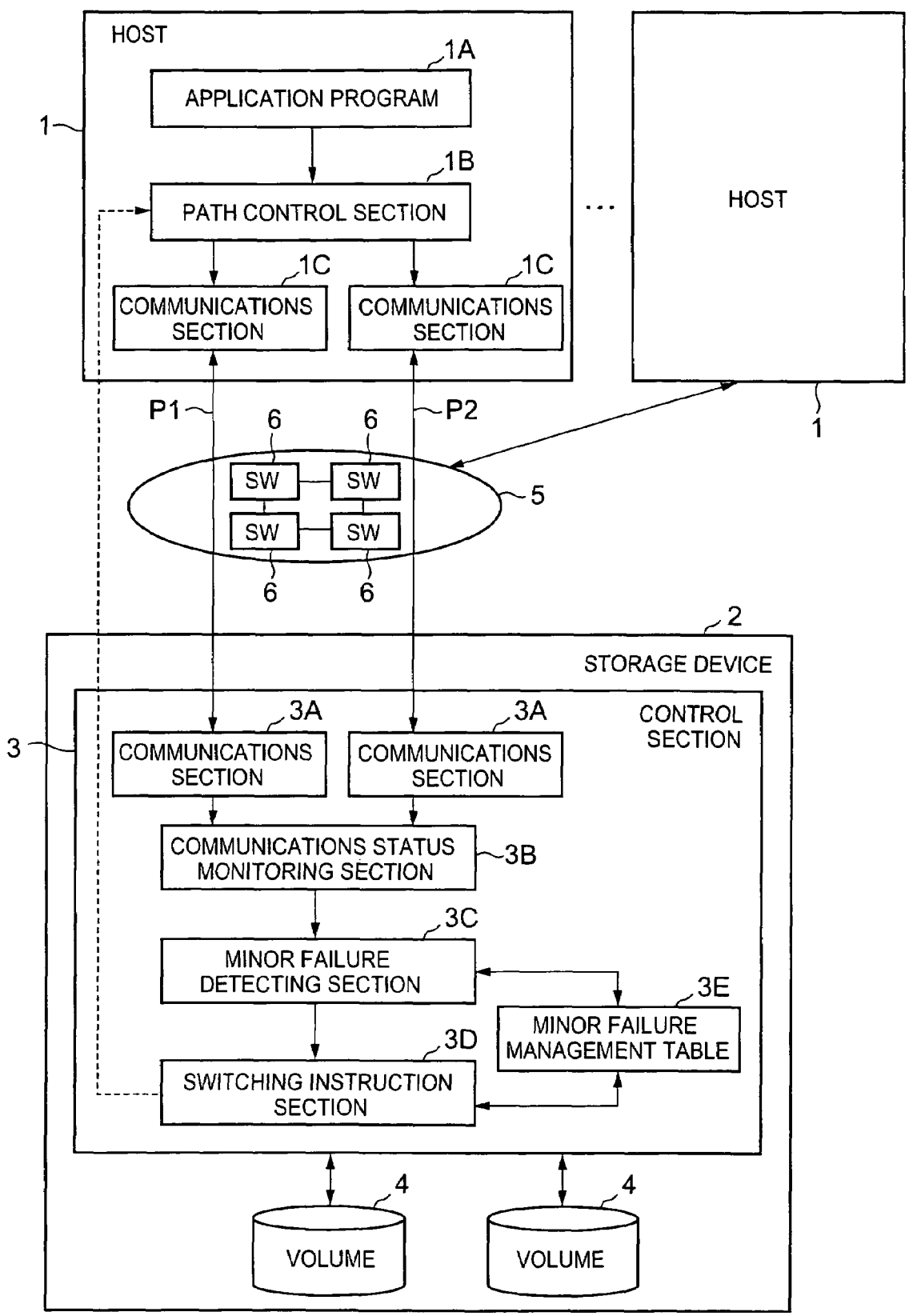
FIG. 1 is an illustrative diagram showing the concept of an embodiment of the present invention.

Below, an embodiment of the present invention is described with respect to the drawings. FIG. 1 is an illustrative diagram showing an overview of the present embodiment. The storage system according to the present embodiment may be constituted by comprising, for example, a plurality of hosts 1, at least one or more storage device 2, and a communications network 5 for connecting the host 1 and the storage device 2.

The host 1 may be provided with an application program 1A, a path control section 1B and a plurality of communications sections 1C, for example. The application program 1A is, for example, a electronic mail processing program or a database management program. The path control section 1B is constituted by a path control program, for example, and it controls data communications between the host and the storage device 2, by means of any one of the plurality of communications sections 1C. The communications sections 1C transmit and receive data on the basis of a prescribed protocol, such as an FC (Fiber Channel) protocol, for example.

Hosts 1 can be divided broadly into so-called open type hosts and mainframe type hosts, for example. Examples of an open type host include server machines which run a generic OS (Operating System), such as Windows®, UNIX®, or the like, and access the storage device 2 by means of a relatively generic communications protocol, such as FC (Fiber Channel), iSCSI (Internet SCSI), TCP/IP (Transmission Control Protocol/Internet Protocol), or the like. Examples of a mainframe type host are mainframe machines which access the storage device 2 by means of a communications protocol, such as FICON (Fiber Connection®), ESCON (Enterprise System Connection®), ACONARC (Advanced Connection Architecture®), FIBARC (Fiber Connection Architecture®), or the like, for example.

The host 1 and the storage device 2 are connected by means of a communications network 5. The communications network 5 may be constituted by a fabric comprising a plurality of switches 6, and the like, for example.

Each storage device 2 may be respectively constituted by comprising, for example, at least one controller 3 and volume 4. The controller 3 controls the operations of the storage device 2, and executes prescribed processing in accordance with write accesses, read accesses, status enquiries and the like from the host 1, and returns corresponding results.

The controller 3 may comprise, for example, a plurality of communications sections 3A, a communications status monitoring section 3B, a minor failure detecting section 3C, a switchover instructing section 3D and a minor failure management table 3E. The communications section 3A sends and receives data to and from the communications section 1C of the host 1. The communications status monitoring section 3B monitors the communications status of the communications section 3A. The minor failure detecting section 3C detects whether or not a previously established prescribed minor failure has occurred on the basis of the monitoring the results of the communications status monitoring section 3B.

The minor failure management table 3E contains respectively associated numbers of occurrences and threshold values, for each of a plurality of types of minor failure. If the minor failure detecting section 3C detects the occurrence of a minor failure, then the corresponding number of occurrences in the minor failure management table 3E is updated. The switching instruction unit 3D outputs a switching request signal for switching the communications path currently used, to another communications path, to the host 1, if the minor failures reach a threshold value.

Here, a minor failure means, for example, a case where a communication has been cut off for a prescribed time period or more (a communications time-out state), where a request to halt command processing has been issued by the host 1 due to a communications time-out (abort request), where a reset command has been issued by the host 1 (reset request), where an abnormality has occurred in the communications signal, or where the responsiveness of the storage device 2 have declined, or the like.

Different threshold values are set for each type of failure, according to its relative importance. For example, a low threshold value can be established for abort requests, whereas a threshold value higher than that established for abort requests can be set for reset requests. Moreover, these threshold values can be changed respectively for each host 1. For example, respectively different threshold values can be set in respect of the same type minor failure, for a host having high priority and a host having low priority.

When the number of occurrences of a particular type of minor failure has reached the threshold value, the switching instruction section 3D outputs a switching request signal, in either an active or passive fashion, to the host 1 in which that minor failure has occurred. Outputting a switching request signal in an active fashion means sending an explicit switching request signal to the host 1, when the number of occurrences of a minor failure has reached its threshold value, for example. Outputting a switching request signal in a passive fashion means, for example, waiting for access from the host 1, when the number of occurrences of a minor failure has reached a threshold value, and then outputting a signal prompting a path switchover in response to that access. The switching request signal is not limited to being a change in a physical quantity, such as the relative strength of a voltage, current or light signal, or the like, and it may also be achieved by means of information, such as a command, data, or the like.

In the present embodiment, a conventional composition is adopted and a hardware error response is used as the switching request signal, whereby a path switchover is requested only to the host 1 in relation to which the minor failure has occurred. A hardware error response is a state that indicates that an error of some kind has occurred in the hardware. The path control section 1B of the host 1 changes the path when it detects a hardware error response of this kind.

Here, it is supposed, for example, that a host 1 is performing data communications with a storage device 2 by means of the path P1, and that an intermittent failure, such as a communications time-out, or the like, has occurred in path P1 on a number of occasions equal to or exceeding the prescribed threshold value. In this case, the controller 3 sends back a hardware error response, in reply to a write access or read access from the host 1. Upon receiving a hardware error response, the path control section 1B switches from the path P1 where the intermittent failure was detected (the original path), to a path P2 that is functioning normally (the target path), and it then re-attempts the access command.

However, if an intermittent failure has occurred on a number of occasions equal to or exceeding the prescribed threshold value in path P2, and the storage device 2 returns a hardware error response to the host 1, then the path control section 1B is able to control the path by means of a plurality of methods, as described below. For example, in a first method, the path control section 1B judges whether or not there exists a normal path apart from the paths P1 and P2, and if there is a normal path (that is not in use), then it is able to switch to that path. Furthermore, as a second method, for example, the path control section 1B can also continue to use the path P2, even if a hardware error response is detected. Moreover, as a third method, for example, the path control section 1B can return the path from the target path P2 to the original path P1. It is also possible to adopt a combination of these switching methods (switching modes), and to use the methods selectively according to a previously established application policy, or the like.

Furthermore, as the examples described below reveal, it is also possible to detect intermittent failures and switch the path accordingly, and the like, within an intelligent switch 6.

In this way, in the present embodiment, it is possible to switch the communications path in accordance with the state of occurrence of intermittent failures. Therefore, if an intermittent failure continues for a long period of time, then a path switchover is prompted and hence the responsiveness of the storage device 2 can be maintained. Moreover, if a particular port of the storage device is shared by a plurality of hosts, for example, then it is possible to prevent an intermittent failure that has occurred in one host from adversely affecting (reducing the responsiveness of) the other hosts sharing that port. Therefore, according to the present embodiment, it is possible to maintain the responsiveness of the storage system, whilst also improving usability.

FIRST EXAMPLE

Figure 2:
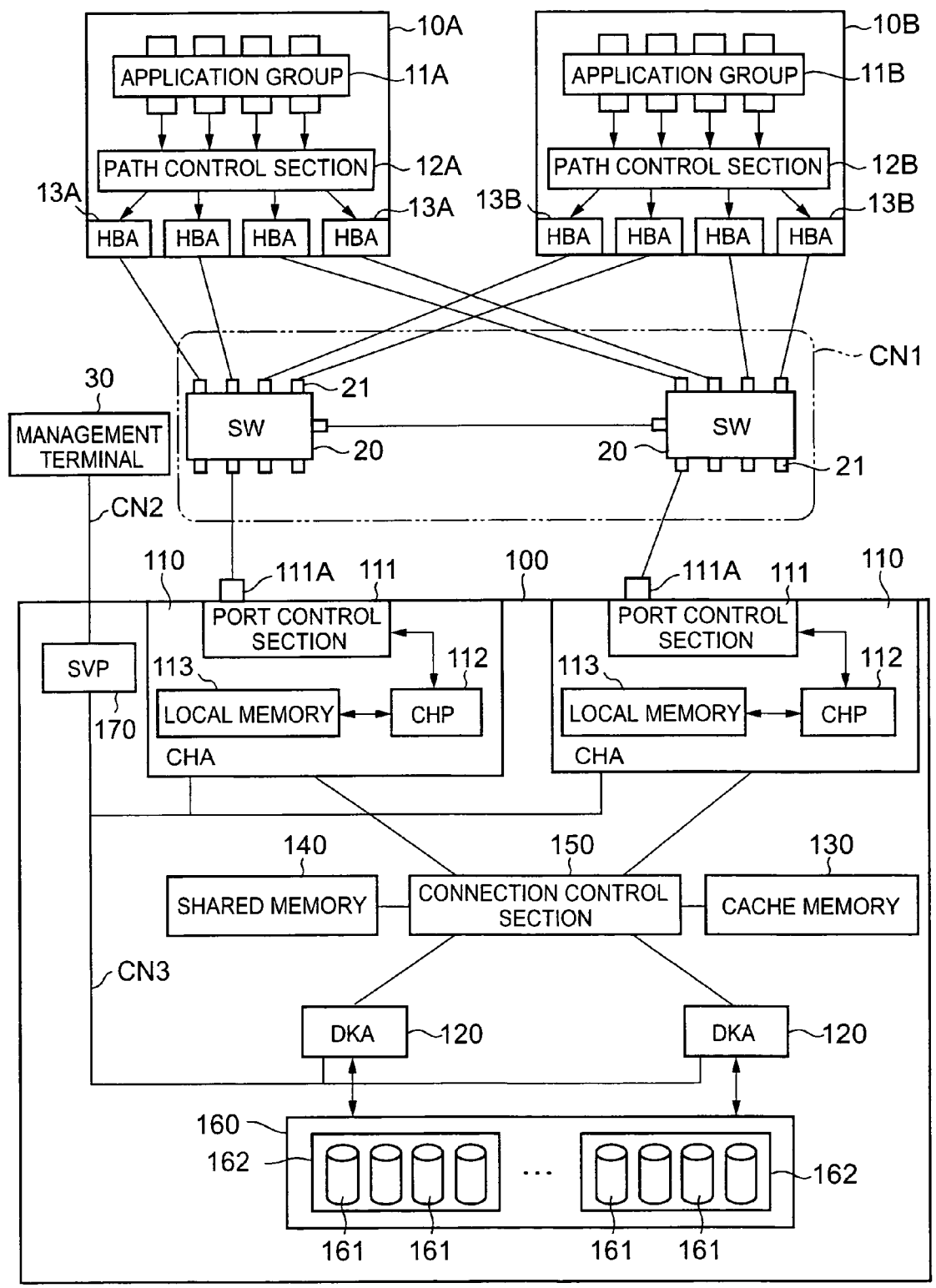
FIG. 2 is a block diagram focusing on the hardware composition of a storage device.

FIG. 2 is a block diagram focusing on the hardware composition of a storage system. The storage system may be constituted by comprising, for example, a plurality of hosts 10A and 10B, a communications network CN1 containing a plurality of switches 20, a storage device 100, and a management terminal 30. The storage device 100 is connected respectively to a plurality of hosts 10A and 10B, via the communications network CN1.

The host 10A is constituted by comprising a group of application programs (hereinafter, "application group") 11A, a path control section 12A and HBAs (Host Bus Adapters) 13A. The application group 11A is a program such as an electronic mail processing program, or the like, and it provides information processing services to client terminals, which are located outside the drawing. The HBAs 13A are responsible for data communications with the storage device 100 on the basis a prescribed protocol. The path control section 12A controls which of the plurality of HBAs 13A is used to perform data communications. The path control section 12A distributes the communications load by using the plurality of HBAs 13A, or as described below, switches the path in order to avoid failures.

Similarly to the host 10A, the host 10B may be constituted by comprising an application group 11B, a path control section 12B and a plurality of HBAs 13B. The functions of these respective sections are similar to those described in the host 10A, and therefore a detailed explanation is omitted here.

In the following description, in cases where no particular distinction is made between the two hosts 10A and 10B, then the term "host 10" is used. Similarly, the application groups 11A and 11B of the respective hosts 10A and 10B may be referred to as "application group 11", the path control sections 12A and 12B may be referred to as "path control section 12", and the HBAs 13A and 13B may be referred to as "HBA 13".

Here, two or more hosts may be provided in the storage system, and it is possible, for example, to combine different types of hosts, such as a mainframe type host and an open type host, within the same storage system.

The open host 10A transfers data on the basis of a fiber channel protocol (FC), iSCSI, TCP/IP, or the like, for example. This open type host may be constituted by a computer device, such as a server machine, personal computer, workstation, portable information terminal, or the like. A mainframe type host, on the other hand, is able to perform data communications with the storage device 100, by means of a special protocol, such as ESCON, FICON, ACONARC, FIBARC, or the like, for example.

The host 10 and the storage device 100 are connected by means of a communications network CN1 in such a manner that two-way communications can be conducted between same. The communications network CN1 may be constituted by a fabric, by joining a plurality of fabric switches 20 provided respectively with a plurality of ports 21, for example. Therefore, by changing the path inside the switches 20, the host 10 is able to send and receive data to and form a port of the storage device 100, by means of a plurality of logical paths.

The management terminal 30 is a device for collecting various types of information relating to the storage device 100, by means of a service processor (SVP) 170, which is described later, and issuing necessary commands to the storage device 100. The management terminal 30 is connected to the SVP 170 via a communications network CN2, such as a LAN (Local Area Network), for example. The management terminal 30 is provided with a GUI (Graphical User Interface) based on a web browser, and information is collected and commands are input by logging in to a WWW (World Wide Web) server provided by the SVP 170.

The storage device 100 can be constituted by comprising, for example, a plurality of channel adapters (hereinafter, "CHA") 110, a plurality of disk adapters (hereinafter, "DKA") 120, a cache memory 130, a shared memory 140, a connection control section 150, a storage section 160, and an SVP 170.

A plurality of CHAs 110 may be provided in the storage device 100. Each CHA 110 is a package for respectively controlling data transfer to and from a respective host 10. Each CHA 110 may be constituted by comprising, for example, a port control section 111 having a communications port 111A, a channel processor (hereinafter, "CHP") 112, and a local memory 113. The port control section 111 performs data transmission and reception on the basis of a prescribed protocol. The CPU 112 controls the operations of the application server 10. The control information, management information, or the like, required in order to control the CHAs 110 is stored in the local memory 113.

As described hereinafter, a plurality of LUs (Logical Units) 164 may correspond to one port 111A, and one port 111A may be shared by a plurality of hosts 10A and 10B. A CHA 110 monitors the state of the path to the host 10, and if it detects a number of intermittent failures equal to or exceeding a threshold value, then it returns a hardware error response to the host 10.

A plurality of DKAs 120 may be provided in the storage device 100. The DKAs 120 respectively control data transfer to and from the storage section 160. For example, each of the DKAs 120 accesses respective disk drives 161 and performs data read out or data writing, by converting a logical block address (LBA) designated by the host 10 into an address on a physical disk.

The cache memory 130 stores write data written from the host 10 and read data read out from the host 10. The cache memory 130 may be constituted by a volatile or a non-volatile memory, for example. If the cache memory 130 is constituted by a volatile memory, then desirably, a memory back-up is performed by means of a battery power source, or the like, which is not illustrated.

The cache memory 130 may be constituted by two regions, namely, a read cache region and a write cache region, for example. The write cache region may store write data in a multi-layered fashion (redundant storage).

The shared memory (which may also be called the control memory) 140 may be constituted by a non-volatile memory, or it may be constituted by a volatile memory. Control information, management information, and the like, is stored in the shared memory 140, for example. Information, such as this control information, and the like, can be managed in a multi-layered fashion by means of a plurality of memories 140.

Here, the shared memory 140 and the cache memory 130 may be constituted respectively by separate memory packages, or the cache memory 130 and the shared memory 140 may be provided in the same memory package. Furthermore, one portion of the memory may be used as a cache region and another portion thereof may be used as a control region. In other words, the shared memory and the cache memory may also be constituted as the same memory or memory group.

A connection control section 150 respectively connects together the respective CHAs 110, the respective DKAs 120, the cache memory 130 and the shared memory 140. Thereby, all of the CHAs 110 and the DKAs 120 may respectively access the cache memory 130 and the shared memory 140, in an independent fashion. The connection control section 150 may be constituted as an ultra-high-speed cross-bar switch, or the like, for example.

The CHAs 110, DKAs 120, cache memory 130 and shared memory 140 may be integrated into one or a plurality of controllers.

The storage section 160 is constituted by a plurality of disk drives 161. The storage section 160 may be provided in the same frame as the controller sections, such as the respective CHAs 110 and the respective DKAs 120, or it may be provided in a separate frame from the controller sections.

The storage section 160 may be constituted by a combination of disk drives 161 of a plurality of different types, for example. For the disk drives 161, it is possible to use, for example, an FC disk (fiber channel disk), a SCSI (Small Computer System Interface) disk, a SATA (Serial AT Attachment) disk, or the like. The types of disk are not limited to those mentioned above, and there may be cases where storage devices equivalent to the indicated disk drives or storage devices developed in the future can be used.

Here, in general, the data processing performance declines in order, from an FC disk, to a SCSI disk to a SATA disk. Currently, the highest data processing performance is provided by FC disks. The data processing performance may include, for example, the IOPS (input/output per second), the MB/s performance, the data access time, or the like. For example, FC disks having high performance and high reliability are used in cases where mission-critical data must be accessible at high speed, whereas SATA disks having lower performance than FC disks are used to save archive data which is not subject to high-speed access requirements, or the like.

The storage section 160 may comprise a plurality of parity groups (also called "RAID groups"). Each parity group 162 is constituted respectively by physical disks 161 of the same type. More specifically, one parity group 162 may be constituted by FC disks only, and another parity group 162 may be constituted by SATA disks only. Furthermore, a parity group 162 may also be constituted by SCSI disks only.

As described in more detail later, at least one or more logical volumes (also called "LDEVs") 163 may be provided in the logical storage regions provided respectively by each of the parity groups 162. By associating these logical volumes 163 with a LU (Logical Unit) 164, an open type host 10 is able to recognize the logical volumes as physical storage devices and to use same. An LU is a volume that is accessible by an open type host 10, whereas the unit accessed by a mainframe type host is a logical volume (LDEV).

The storage resources used by the storage device 100 do not have to be located entirely within the storage device 100. The storage device 100 is able to incorporate and use storage resources existing externally to the storage device 100, exactly as if there were its own storage resources. More specifically, for example, the storage device 100 is able to connect directly with an externally located storage device (not illustrated) belonging to the same company or another company, by means of a SAN (Storage Area Network), or the like, without passing via a host 10. The storage device 100 is able to incorporate external logical volumes by mapping logical volumes belonging to an external storage device, to its own LU or LDEV or intermediate volumes.

The SVP 170 is connected respectively to each of the CHAs 110 and the DKAs 120, by means of an internal network CN3, such as a LAN. The SVP 170 gathers the various internal statuses of the storage device 100 and supplies them to the management terminal 30, either directly or after processing.

Figure 3:
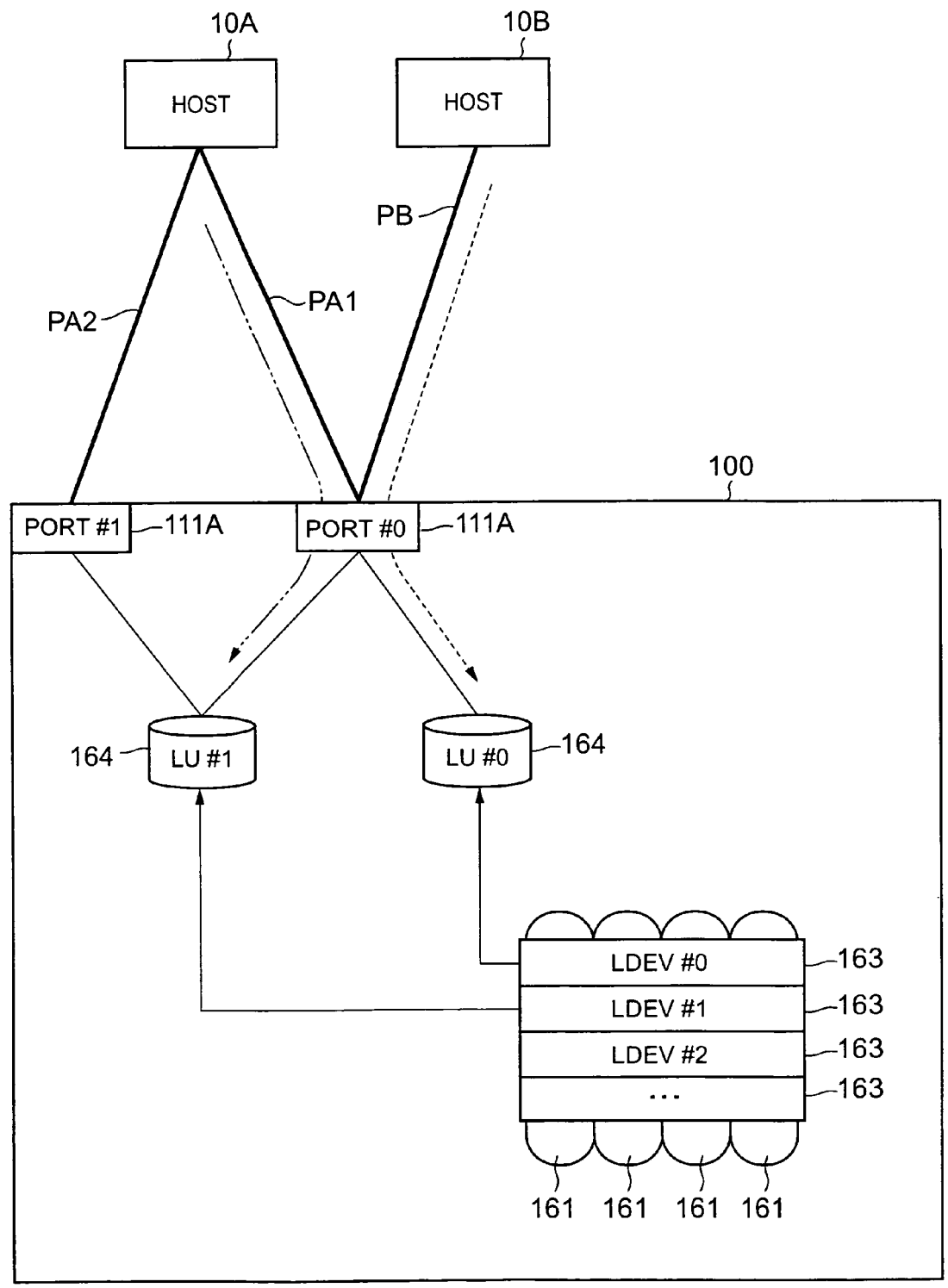
FIG. 3 is an illustrative diagram focusing on the logical composition of a storage device.

FIG. 3 is an illustrative diagram focusing on the logical structure of the storage device 100. For example, at least one or more logical volumes 163 can be established on a storage region formed by a prescribed number of disk drives 161, such as one set of four disk drives. One of a plurality of these logical volumes 163 is allocated to an LU 164. The LU 164 is connected to one or a plurality of ports 111A.

The host 10 accesses a prescribed LU 164 by means of a prescribed port 111A, and it performs data reading or data writing. In the example illustrated, a simplified diagram is shown for the purpose of the description, but the host 10A is connected to port #0 via path PA1, and it is able to access the LU #1 connected to that port #0. Moreover, the host 10A is also connected to the port #1 via another path PA2, and it is able to access the LU #1 from port #1 as well. In other words, a plurality of paths PA1 and PA2 are provided between the host 10A and the LU #1, and the host can access the LU via any of those paths.

On the other hand, the host 10B is connected to port #0 via the path PB and is able to access the LU #0 connected to port #0. More specifically, in the example illustrated, the port #0 of the storage device 100 is shared by a plurality of hosts 10A and 10B.

If intermittent failures occur frequently whilst the host 10A is using the LU #1 via the path PA1, then the responsiveness of the storage device 100 decline, and as a result, there is a possibility that the information processing services at the host 10A may be affected adversely. Furthermore, for the other host 10B which shares use of the port #0, if intermittent failures occur frequently in the host 10A, then the response from the storage device 100 is slowed, and there is a possibility that the information processing services provided by the host 10B will also be affected adversely. Therefore, the storage device 100 causes the path used to be switched from PA1 to PA2, by returning a hardware error response requesting a path switchover.

FIG. 4 is an illustrative diagram showing one example of path management information T1. The path management information T1 is stored in the memory of each host 10 (not illustrated), and is used by the path control section 12. The path management information T1 may be constituted by associating, for example, information for distinguishing whether or not a path is a path currently in use (main) or a spare path (secondary), path identification information and connection destination LU identification information, and a path status (normal status or error status). In the diagram, a case is shown where two paths are established for one LU, but it is also possible to make three or more paths correspond to one LU. Furthermore, the path statuses may also include a hardware error response status indicating a state where a hardware error response has been returned.

FIG. 5 is an illustrative diagram showing one example of an intermittent failure management table T2. The intermittent failure management table T2 is stored in the shared memory 140 of the storage device 100, for example. An intermittent failure management table T2 is prepared respectively for each host, as illustrated by T2A-T2C. The intermittent failure management table T2 relating to the host using the CHA 110 is copied to the local memory 113 of that CHA 110.

The intermittent failure management table T2 may be constituted by mutually associating, for example, an error type, a number of occurrences of that error type, and a threshold value for that number of occurrences. An error type indicates a previously established type of intermittent failure. In the present example, temporary or sporadic minor failures where functions are recovered after a short period of time are managed as intermittent failures.

Examples of error types are, for instance: cases where a command abort process (abort request) is issued by the host 10, cases where a reset process (reset request) is issued by the host 10, cases where there is no response from the host 10 for a prescribed period of time or more (communications time-out), cases where there is an abnormality in the communications signal, and cases where the response time of the storage device 100 has exceeded a prescribed period of time, and the like. It is possible to change the error types monitored, respectively, for each host.

Here, the command abort process and the reset process are issued to the storage device 100 by the host 10, in cases where the host 10 has not been able to receive a response from the storage device 100 for a prescribed period of time or more (a communications time-out). Cases where there is an abnormality in the communications signal are cases where, for example, a frame that should have reached the storage device 100 has been lost (missing frame number), or where the reliability of error detection information, such as CRC (Cyclic Redundancy Check) information, or the like, has been lost.

The number of occurrences indicates the number of times that that error type has occurred in the path currently in use, for example. The number of occurrences is counted in the form of the cumulative figure occurring on each particular day, or the cumulative figure occurring from a certain time to a certain time. Furthermore, the number of occurrences may be reset each time a prescribed time period has elapsed, or it may be reset manually by the system administrator, or the like.

Threshold values Th are previously established respectively for each error type. Different threshold values Th can be set respectively for each error type. For example, the threshold value for a command abort process may be set to a lower value than the threshold value for a reset process. By setting the number of occurrences to a suitable value for each error type, it is possible to give a weighting to each error type and hence determine the timing at which a path switchover is prompted to the host 10.

Figure 6:
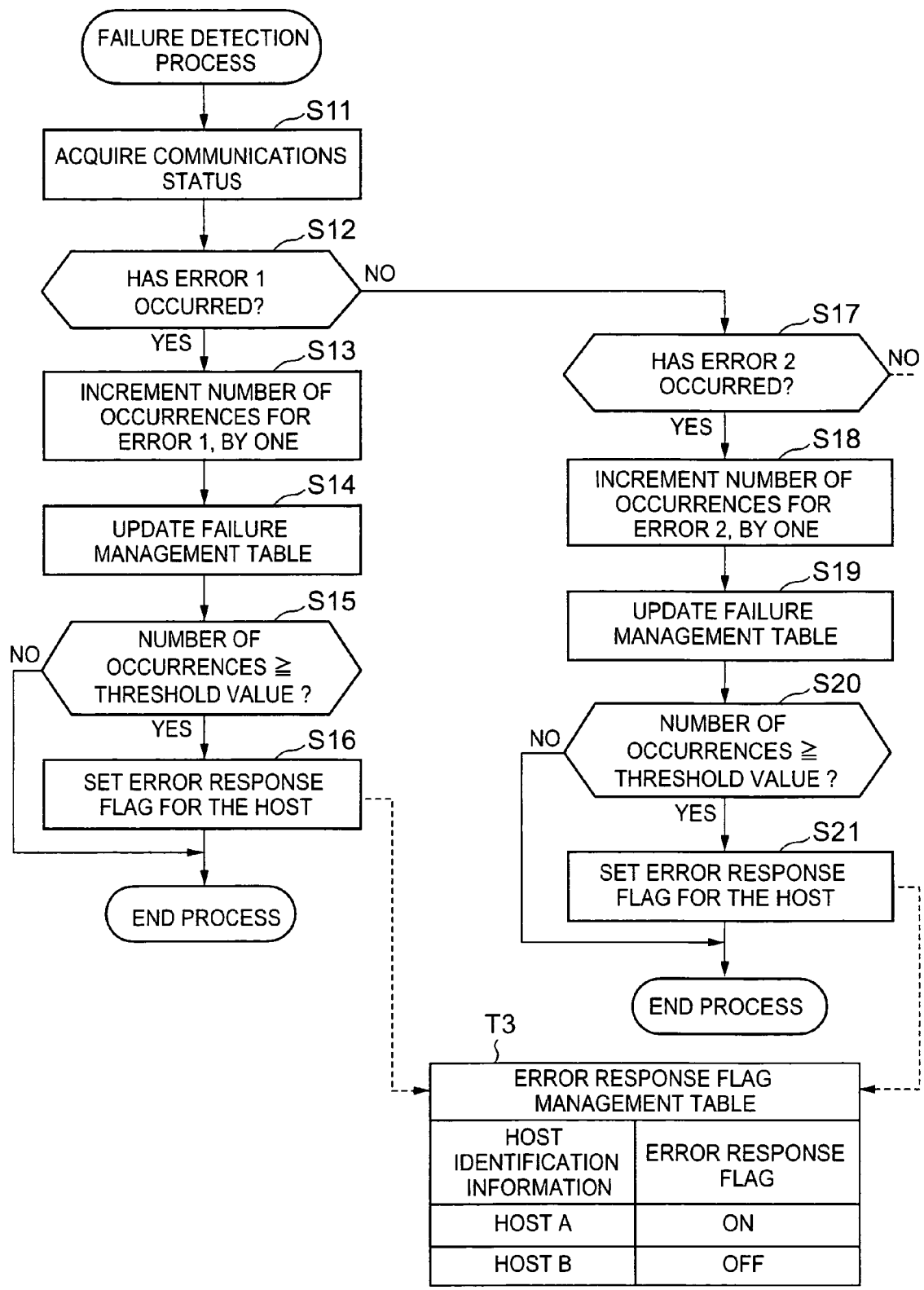
FIG. 6 is a flowchart showing an overview of failure detection processing.

FIG. 6 is a flowchart showing an overview of failure detection processing. This processing is performed respectively by each of the CHAs 110, for example. The CHA 110 occasionally acquires the status of the communications with the host to which it is connected (S11). This communications status includes the type of command received from the host 10 (command abort process request, reset process request, or the like) and the time without response from the host 10, or the like.

The CHA 110 judges whether or not the error type is one registered in the intermittent failure management table T2, on the basis of the acquired communications status. For example, it judges whether or not a first error type has been detected (S12), and if the first error type has been detected (S12: YES), then it increments the number of occurrences for that first error type, by one (S13), and updates the intermittent failure management table T2 accordingly (S14). The CHA 110 judges whether or not the number of occurrences of the first error type has reached the previously established threshold value (S15). If the number of occurrences of the first error type has reached the threshold value (S15: YES), then the hardware error response flag for that host 10 in the error response flag management table T3 (abbreviated to error response flag in the diagrams), is set to on (S16). If the number of occurrences of the first error type has not reached the threshold value (S15: NO), then the CHA 110 terminates this process and after a suitable period of time, it executes the step in S11 again. The error response management table T3 is stored in the shared memory 140, and required parts of the table are copied to the local memories 113 of each respective CHA 110.

If the first error type is not detected (S12: NO), then it is judged whether or not the second error type has been detected (S17), and processing similar to S13-S16 is carried out. More specifically, if a second error type is detected (S17: YES), then the CHA 110 increments the number of occurrences of the second error type in the intermittent failure management table T2 corresponding to that host 10, by one (S18), and it updates the intermittent failure management table T2 accordingly (S19). If the number of occurrences of the second error type has reached a previously established threshold value (S20: YES), then the CHA 110 sets the hardware error response flag for that host 10 to on (S21).

As described hereinafter, if the hardware error response flag for a particular host 10 has been set to on, then regardless of whether or not a hardware error has actually occurred, the CHA 110 returns a hardware error response to particular accesses from that host 10.

As described above, the CHA 110 counts the number of occurrences respectively for each error type registered previously in the intermittent failure management table T2, and it judges whether or not each of the respective numbers of occurrences has reached a previously established threshold value. If the number of occurrences of an intermittent failure has reached a threshold value, then the CHA 110 sets the hardware error response flag for the host relating to that failure, to on.

The processing illustrated in FIG. 6 is an example and the present invention is not limited to this example. In FIG. 6, only two error types are illustrated, but the CHA 110 respectively judges all of the error types registered in the intermittent failure management table T2.

Figure 7:
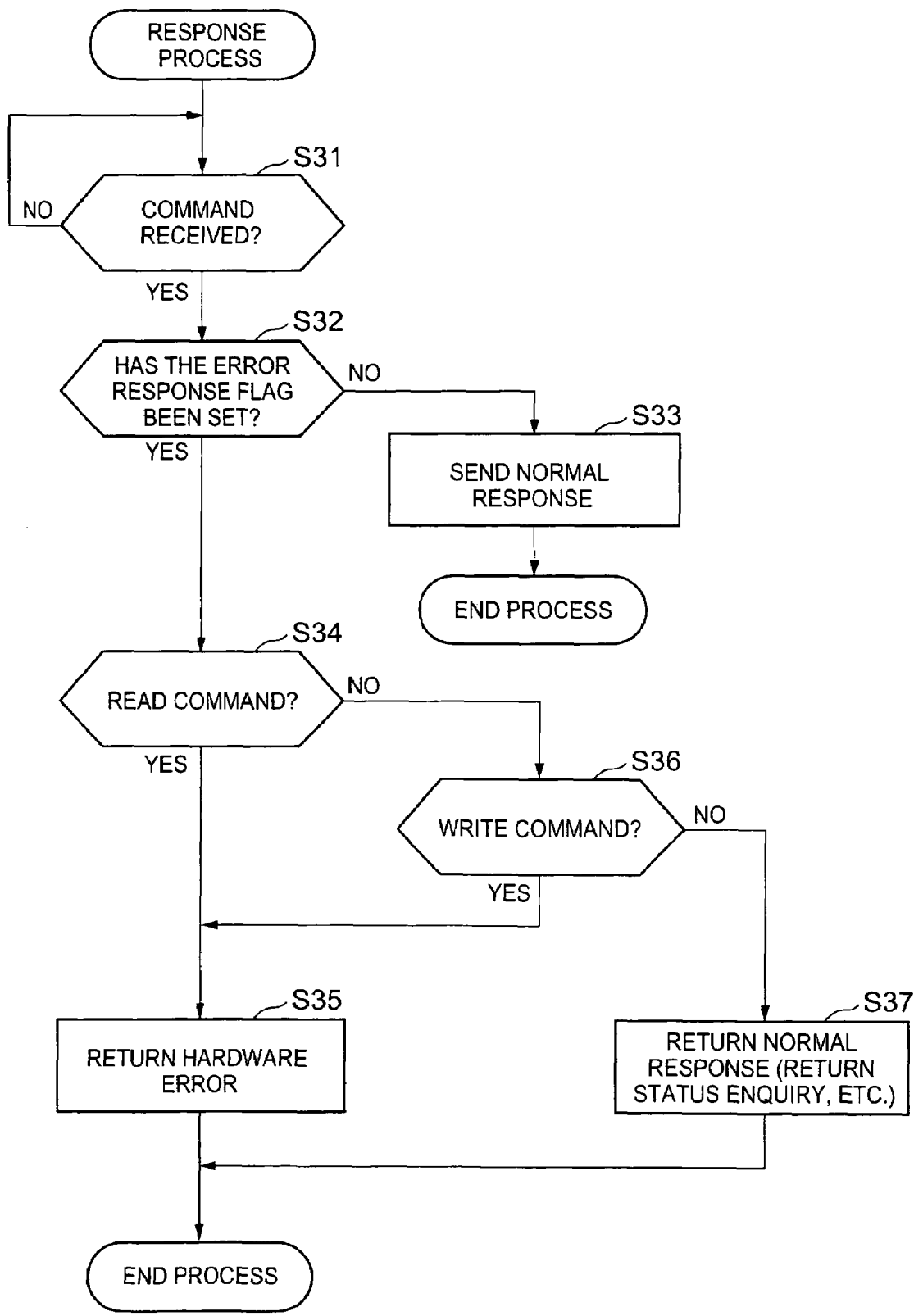
FIG. 7 is a flowchart showing an overview of response processing.

FIG. 7 is a flowchart showing an overview of a response process for processing an access from a host 10. This processing is performed by the CHA 110, for example. Upon receiving a command from the host 10 (S31: YES), the CHA 110 refers to the hardware error response flag management table T3, and judges whether or not the hardware error response flag for the host 10 requesting access is set to on (S32).

If the hardware error response flag for that host 10 is not set to on (S32: NO), then the CHA 110 carries out processing corresponding to the received command and sends the result to the host 10 (S33). More specifically, for example, in the case of a read access, the requested read data is acquired from the cache memory 130 or one of the disk drives 161, and this read data is sent to the host 10. Furthermore, in the case of a write access, for example, the write data is stored in the disk drive 161 after storing the write data in the cache memory 130.

If the hardware error response flag for the host 10 requesting access is set to on (S32: YES), then the CHA 110 judges whether or not read access has been requested (S34). In the event of read access (S34: YES), the CHA 110 sends a hardware error response to the host 10 (S35).

If read access is not requested (S34: NO), then the CHA 110 judges whether or not write access has been requested (S36). If write access has been requested (S36: YES), the CHA 110 sends a hardware error response to the host 10 (S35).

More specifically, if a host 10 which has a hardware error response flag set to on requests either a read access or write access, then the CHA 110 returns a hardware error response to that host 10. Upon receiving this hardware error response, the path control section 12 of the host 10 attempts to switch paths, as described below.

Even in the case of a host 10 for which the hardware error response flag is set to on, if the host 10 makes an access other than a read access or write access (S34: NO and S36: NO), then the CHA 110 is able to return a normal response (S37). A command other than a read access or write access command may be, for example, a command enquiring about the various status of the storage device 100, such as an enquiry command. It is also possible to adopt a composition wherein a hardware error response is returned universally to all accesses from a host 10 for which the flag has been set to on.

Figure 8:
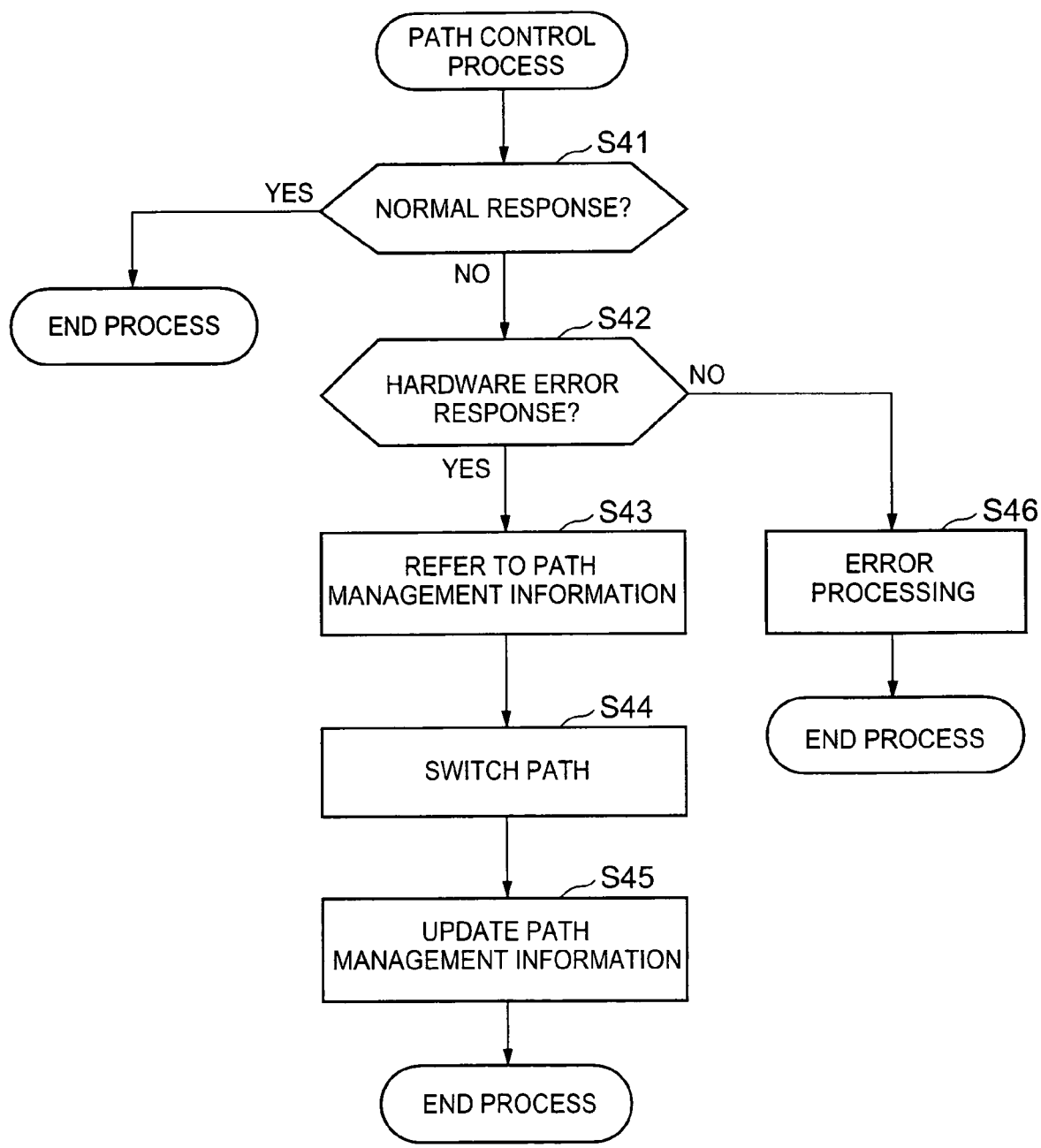
FIG. 8 is a flowchart showing an overview of path control processing.

FIG. 8 is a flowchart showing an overview of path control processing. This processing is performed by the path control section 12 of the host 10, for example. The host 10 judges whether or not the response from the storage device 100 is a normal response (S41).

If the response is normal (S41: YES), then the routine terminates. If the response is not normal (S41: NO), then the host 10 judges whether or not the response from the storage device 100 is a hardware error response (S42). In the event of a hardware error response (S42: YES), the host 10 refers to the path control information T1 (S43), and switches the path by setting a spare alternative path (secondary path) as a main path (S44), and updates the path management information T1 accordingly (S45). If the response from the storage device 100 is a response other than a hardware error response, then it is possible to carry out error processing corresponding to that error response (S46).

In this way, the host 10 refers to the path management information T1 and switches to another path, when a hardware error response is returned by the storage device 100. After switching the path, the host 10 accesses the storage device 100 again.

Figure 9:
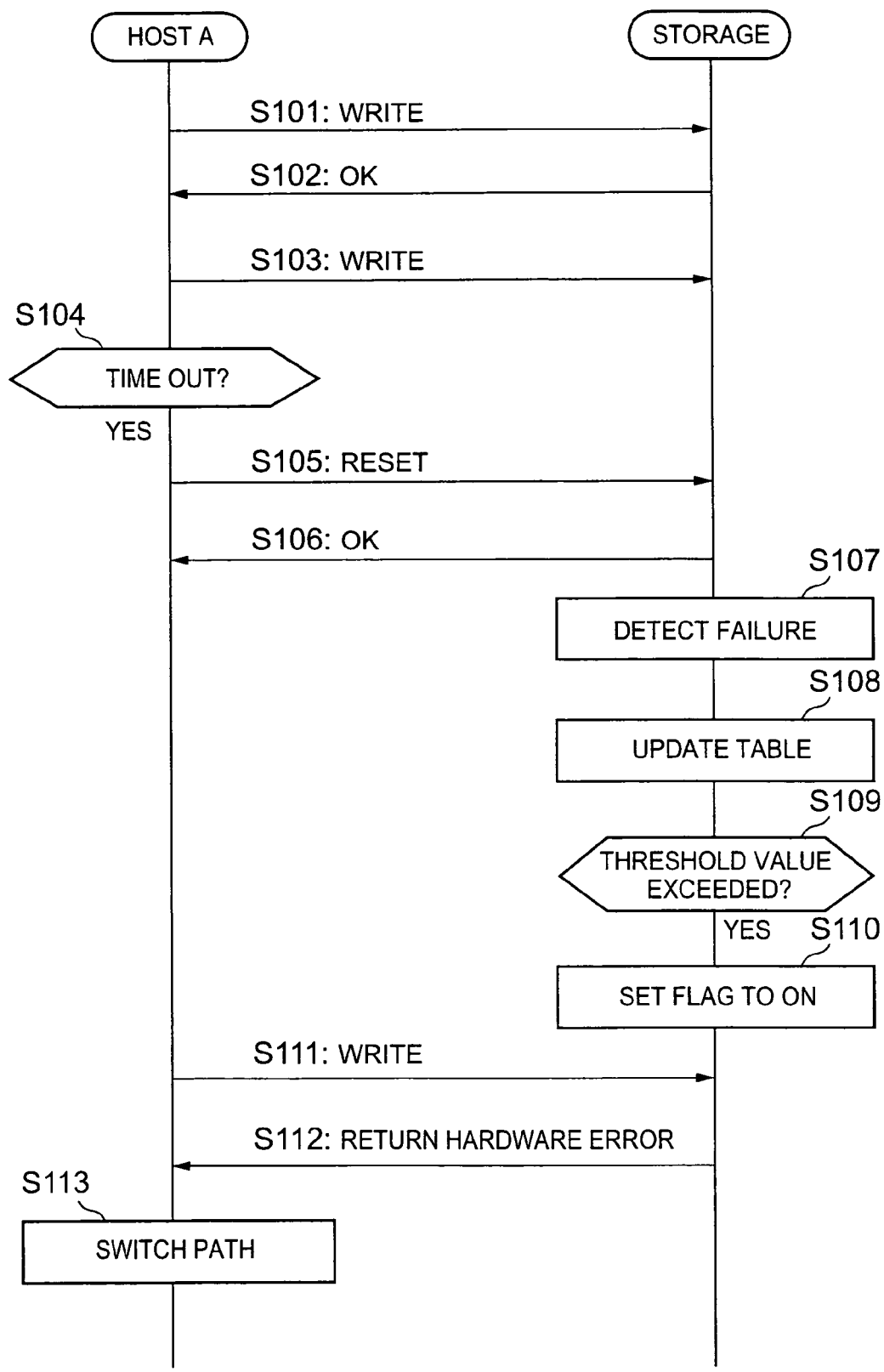
FIG. 9 is a flowchart showing the overview of the overall operation of a storage system.

FIG. 9 is a flowchart showing an overview of the whole operation of the storage system relating to path switching. In FIG. 9, the host 10A is described as a representative example. A portion of the aforementioned processes are illustrated in FIG. 9.

If the host 10A performs a write access at a certain time before an intermittent failure has occurred in the path (S101), then after storing the write data in the cache memory 130, or after writing the write data to a disk drive 161, the storage device 100 reports completion of the write operation to the host 10A (S102).

Here, it is supposed that the host 10A has attempted another write access (S103), and that for some reason, no response from the storage device 100 has been received within a prescribed time period (S104: YES). When the host 10A detects a communications time-out, it issues a reset command, for example (S105).

Upon receiving a reset command from the host 10A, the storage device 100 resets the write command process that was received previously, and reports to the host 10A that the reset process has been completed (S106).

Moreover, the storage device 100 refers to the intermittent failure management table T2 associated with the host 10A and judges whether or not reception of a reset command has been registered as an intermittent failure. If reception of a reset command has been registered in the intermittent failure management table T2, then the storage device 100 reports the occurrence of the intermittent failure (S107), and then increments the number of occurrences of the reset command by one and updates the intermittent failure management table T2 accordingly (S108).

The storage device 100 judges whether or not the number of received reset commands has reached a threshold value (S109), and if the threshold value has been reached (S109: YES), then the hardware error response flag for the host 10A is set to on (S110).

If the host 10A again attempts a write access to the storage device 100 (S111), then the storage device 100 returns a hardware error response to the host 10A (S112). Upon receiving a hardware error response from the storage device 100, the host 10A switches to another path (S113).

By adopting the composition described above, the present example has the following beneficial effects. In the present example, a composition is adopted whereby, even in the case of an intermittent failure where normally the system would wait for functions to be recovered naturally, a signal prompting a path switchover is sent to the host 10 in accordance with the state of occurrence of the intermittent failure. Therefore, if an intermittent failure occurs in a continuing fashion, then path switching can be prompted at an early stage, and hence it is possible to prevent adverse effects on the information processing services of the host 10.

In the present example, a composition is adopted wherein the frequency of occurrence of failures is monitored and path switchover is prompted only with respect to the failures previously registered in the intermittent failure management table T2. Therefore, by referring to the maintenance history, or the like, of the storage system, for example, it is possible to monitor only those intermittent failures that are liable to occur in a continuing fashion.

In the present example, a composition is adopted wherein a hardware error response is used as one example of a signal prompting path switchover in the host 10. Accordingly, it is possible to prompt path switchover only with respect to the host 10 relating to the intermittent failure. Moreover, since a composition is adopted wherein path switching is prompted to the host 10 by using an existing hardware error response, then increase in costs can be restricted whilst the responsiveness of the storage system can be improved.

In the present example, a composition is adopted wherein path switching is requested by monitoring the state of occurrence of intermittent failures in the storage device 100, and therefore it is possible to improve the responsiveness and the usability of the storage system without changing the composition of the host 10 or the switches 20 in any way.

SECOND EXAMPLE

Figure 10:
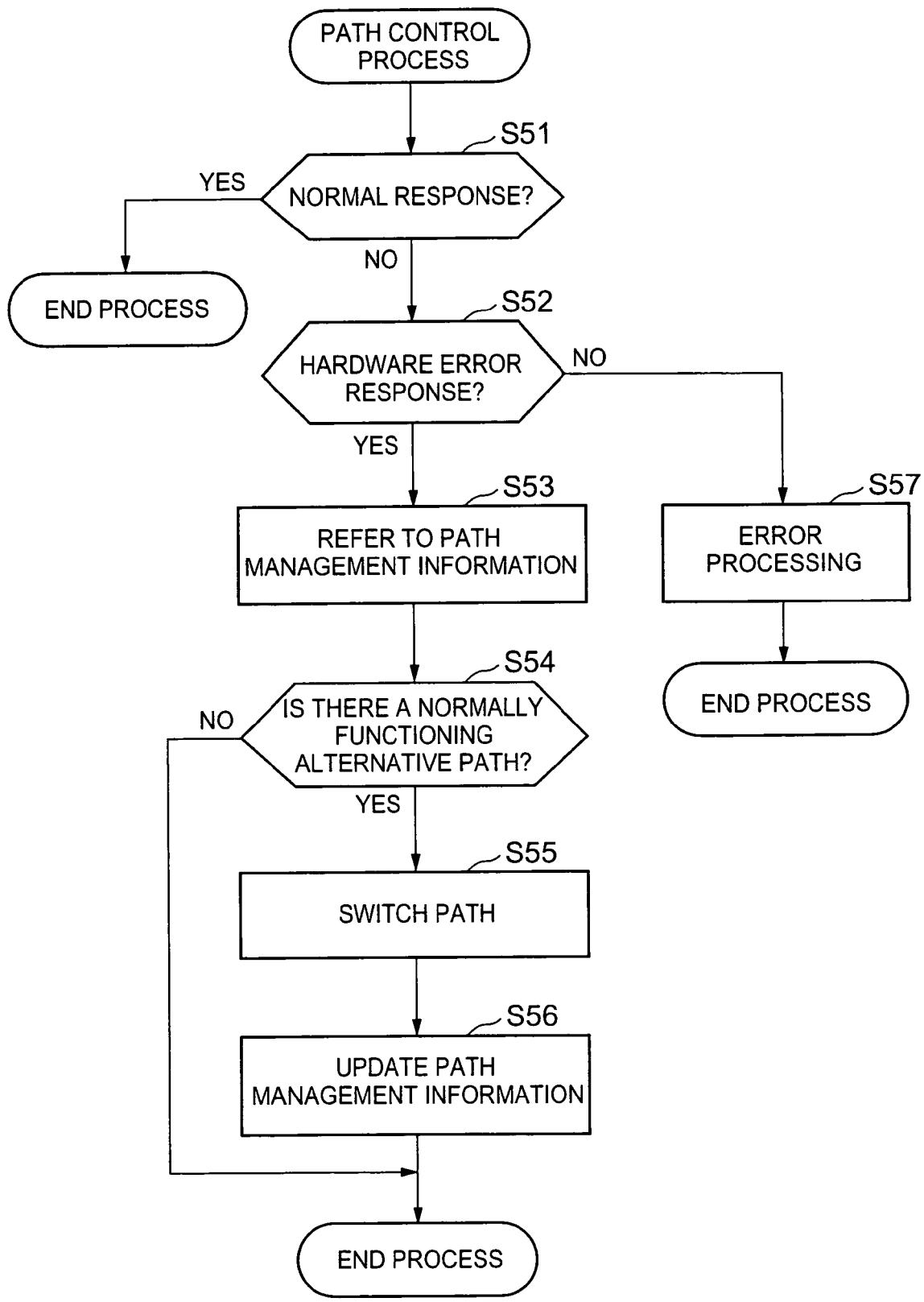
FIG. 10 is a flowchart showing an overview of path control processing relating to a second example of the invention.

A second example of the present invention is now described on the basis of FIG. 10. The respective examples described below correspond to modifications of the first example. FIG. 10 is a flowchart of path control processing according to the present example, wherein the host 10 judges whether or not the response from the storage device 100 is a normal response (S51), and if the response is normal (S51: YES), then this process is terminated.

If the response is not a normal response (S51: NO), then the host 10 judges whether or not the response is a hardware error response (S52), and if it is a hardware error response (S52: YES), then it refers to the path management information T1 (S53) and judges whether or not there is an alternative path that is functioning normally (S54). If there exists no alternative path that is functioning normally (S54: NO), then the host 10 terminates this process without switching the path. Therefore, in this case, the host 10 waits passively for the path to recover from the intermittent failure.

However, if there is an alternative path that is functioning normally (S54: YES), then the host 10 switches the path by setting the normally functioning alternative path as a main path (S55), and updates the path management information T1 (S56). If the response from the storage device 100 is a response other than a hardware error response, then it is possible to carry out error processing corresponding to that error response (S57).

In this way, if there are no normally functioning alternative paths remaining, then the host 10 continues to use the path it is currently using, without making any changes.

THIRD EXAMPLE

Figure 11:
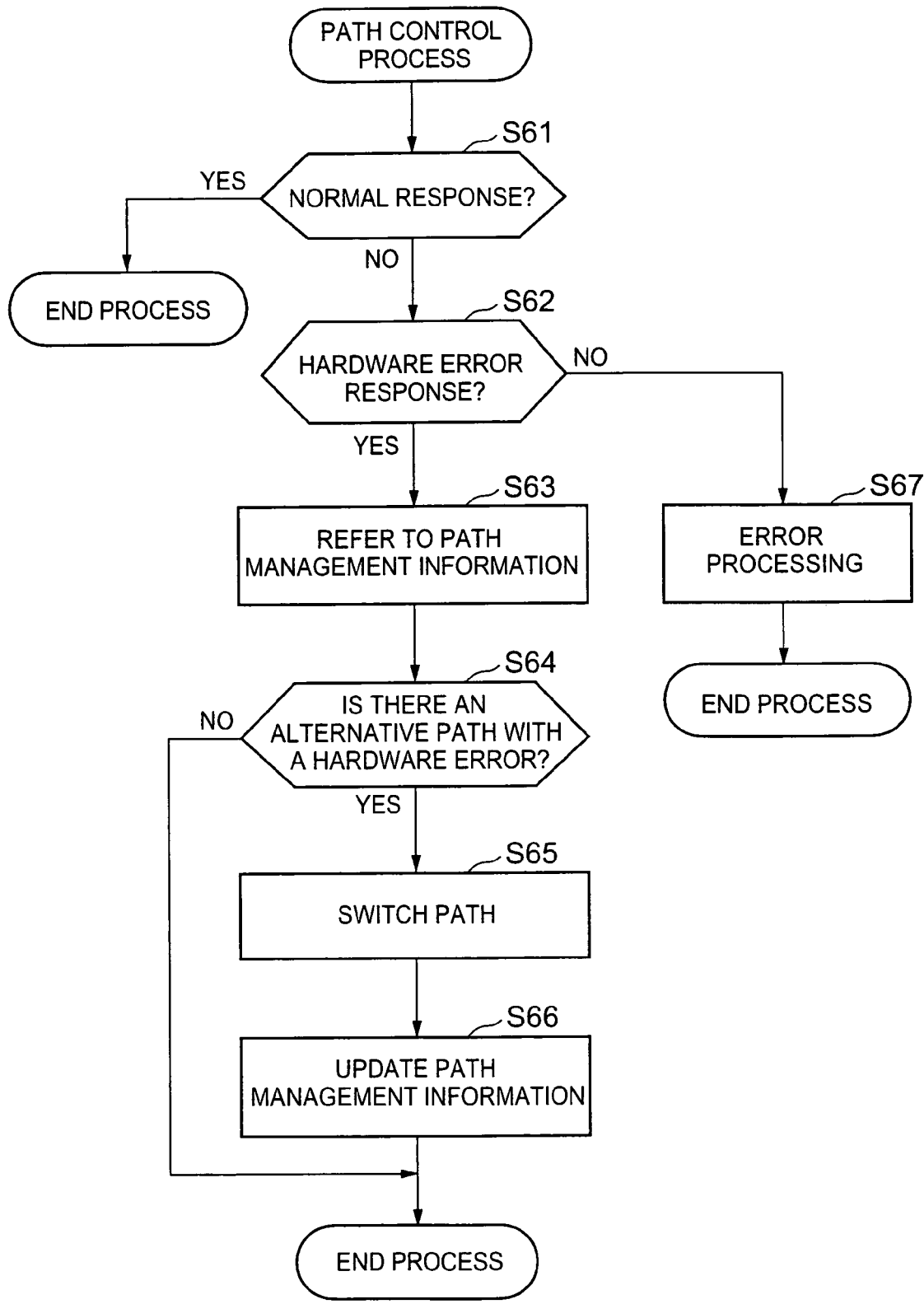
FIG. 11 is a flowchart showing an overview of path control processing relating to a third example of the invention.

FIG. 11 is a flowchart of path control processing relating to a third example of the invention. This processing is approximately the same as the processing described with reference to FIG. 10, but the details of the processing in S64 are different from those in S54.

The host 10 judges whether or not the response from the storage device 100 is a normal response (S61), and if it is a normal response (S61: YES), then the host 10 terminates this process. If the response is not a normal response (S61: NO), then the host 10 judges whether or not the response is a hardware error response (S62), and if it is a hardware error response (S62: YES), then it refers to the path management information T1 (S63) and judges whether or not there exists an alternative path for which a hardware error response has been returned (S64).

If there exists no alternative path for which a hardware error response has been returned (S64: NO), then the host 10 terminates this process without switching the path. Therefore, in this case, the host 10 waits passively for the path to recover from the intermittent failure.

However, if there is an alternative path for which a hardware error response has been returned (S64: YES), then the host 10 switches the path by setting the normal alternative path as a main path (S65), and updates the path management information T1 (S66). If the response from the storage device 100 is a response other than a hardware error response, then it is possible to carry out error processing corresponding to that error response (S67).

Although there is a possibility that an intermittent failure may occur in a continuing fashion, there is also a possibility that it may be resolved naturally with the passage of time. Therefore, in the present example, if a new hardware error response is detected, then the path is switched back to a path (original path) from which communications were switched previously on the basis of the past hardware error response.

It is also possible to combine the processing in FIG. 10 and FIG. 11. For example, the host 10 judges whether or not there remains a normally functioning alternative path (S54), and if there remains a normally functioning alternative path, then it switches to that path. If there remains no normally functioning alternative path (S54: NO), then the host 10 judges whether or not there exists another path which has returned a hardware error response (S64), and if there is a path that has returned a hardware error response, then it may switch to that path.

FOURTH EXAMPLE

Figure 12:
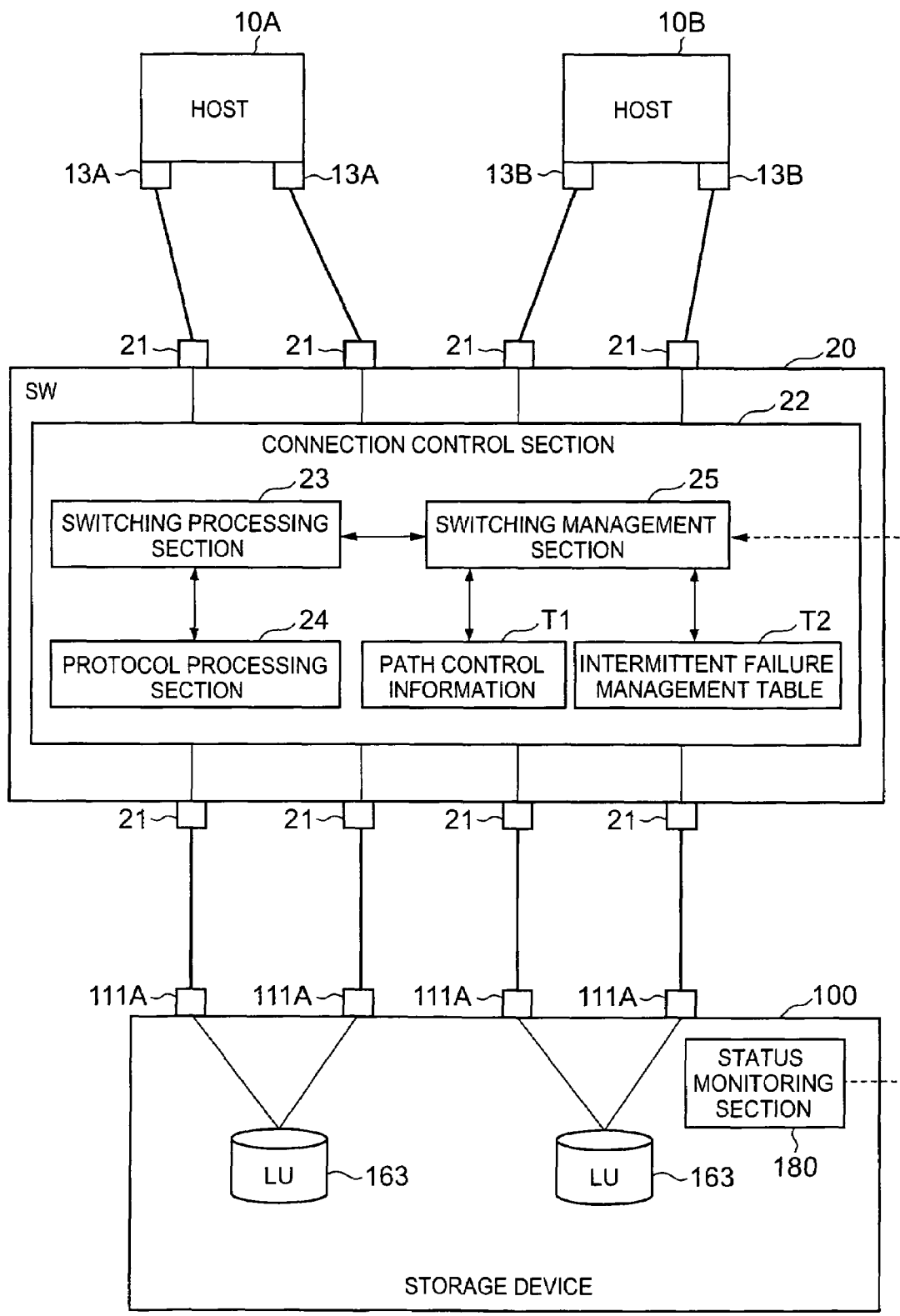
FIG. 12 is a block diagram of a storage system relating to a fourth example of the present invention.

FIG. 12 is a block diagram showing the general composition of a storage system according to a fourth example of the present invention. In the present example, the state of occurrence of intermittent failures is monitored and the path is switched by means of an intelligent high-function switch 20.

The switch 20 may be constituted, for example, by comprising a plurality of ports 21 and a connection control section 22 for controlling the connection of the respective ports. The connection control section 22 may comprise, for example, a switching processing section 23, a protocol processing section 24, a switch management section 25, a path management information table T1 and an intermittent failure management table T2.

The switching processing section 23 makes connections between respective ports 21. The protocol processing section 24 carries out necessary processing for transferring the data on the basis of a prescribed protocol. The switch management section 25 monitors the state of occurrence of intermittent failures on the basis of the communications status detected inside the switch 20, and it outputs a path switching request signal to the switching processing section 23 as and when necessary.

As indicated by the dotted line in the diagram, it is also possible for a status monitoring section 180 that monitors the status inside the storage device 100 to send various information on the status of the storage device 100, such as the response time, to the switching management unit 25. An SVP 170 may be used as the status monitoring section 180, for example. The status monitoring section 180 is also able to send the internal status information to the switch 20, by means of an FC_SAN, or via a separate network, such as a LAN or the like.

Moreover, a composition may also be adopted wherein the functions of monitoring intermittent failures and requesting a path switchover are provided inside the storage device 100, similarly to the first example, in such a manner that only the process of switching paths is implemented within the switch 20.

FIFTH EXAMPLE

Figure 13:
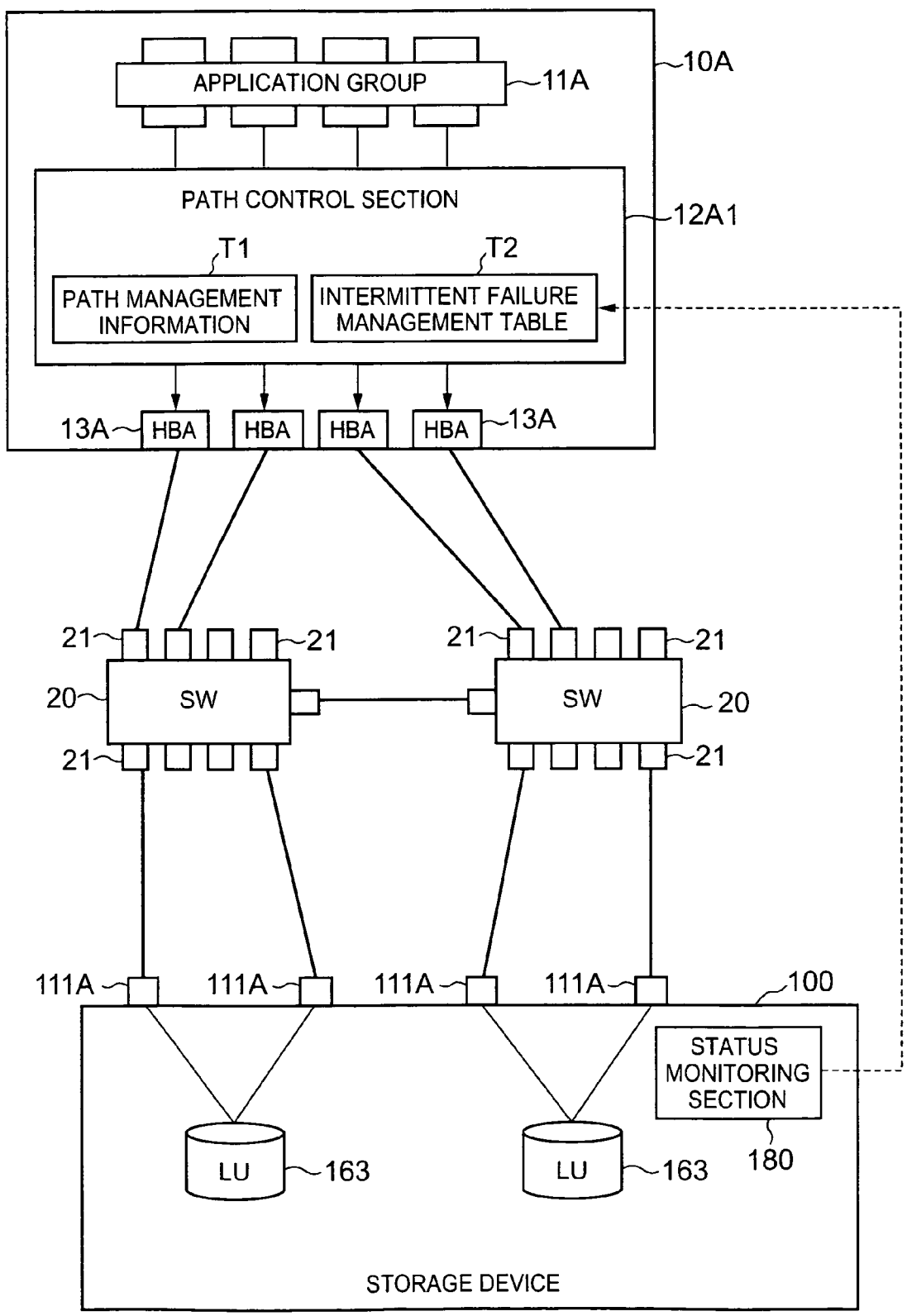
FIG. 13 is a block diagram of a storage system relating to a fifth example of the present invention.

FIG. 13 is a block diagram of a storage system relating to a fifth example of the present invention. In the present example, the monitoring of intermittent failures and the switching of the communications path are performed respectively inside each of the hosts 10.

Taking the host 10A as an example, the path control section 12A1 is able to use path management information T1 and an intermittent failure management table T2. These respective information T1 and T2 are stored in a local memory or local disk provided by the host 10A.

Therefore, the path control section 12A1 monitors the state of occurrence of intermittent failures, and if a number of intermittent failures equal to or exceeding a prescribed threshold value have occurred, then it switches the path. Consequently, in the present example, the path control section 12A1 prompts switching of the path to itself.

SIXTH EXAMPLE

Figure 14:
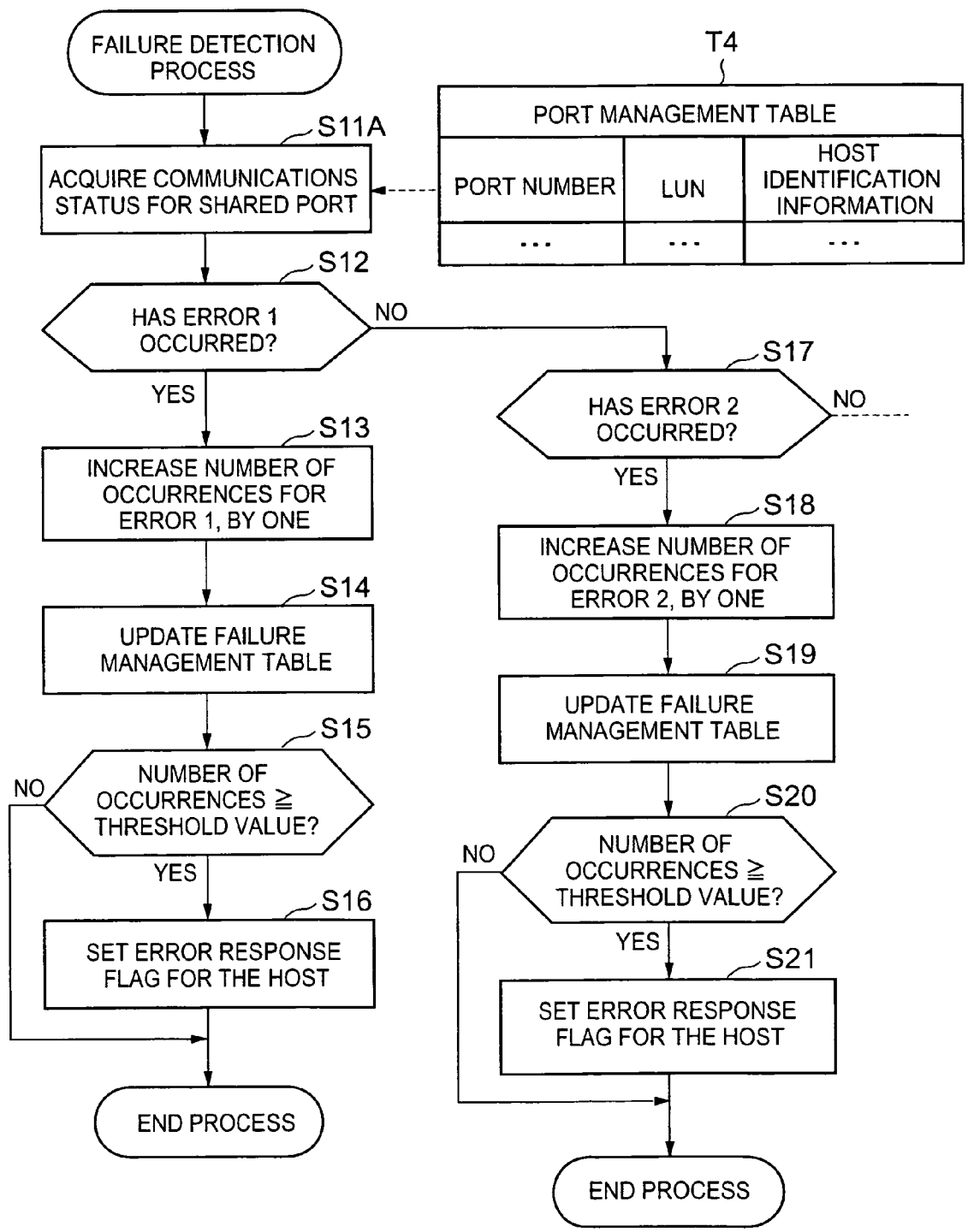
FIG. 14 is a flowchart showing an overview of failure detection processing relating to a sixth example of the invention.

FIG. 14 is a flowchart of failure detection processing relating to a sixth example of the invention. This processing is approximately the same as the failure detection processing described with reference to FIG. 6, but the details of the first step S11A are different.

More specifically, in the present process, the state of occurrence of intermittent failures is monitored by acquiring the communications statuses relating to the ports 111A shared by a plurality of hosts 10 only (S11A). For example, the respective port numbers, the LUN, and identification information for the hosts using that port are mutually associated in a port management table T4, and a CHA 110 is able to detect a port that is shared by a plurality of hosts 10 by referring to this port management table T4.

In this way, by monitoring the state of occurrence of intermittent failures for shared ports only, and requesting path switchover accordingly, it is possible to prevent an intermittent failure that has occurred in relation to one host 10 from having an adverse effect on other hosts 10, whilst at the same time, the load of the monitoring process can be reduced.

The present invention is not limited to the examples described above. It is possible for a person skilled in the art to make various additions, modifications, or the like, without departing from the scope of the present invention.

What is claimed is:

1. A storage system comprising:
a plurality of host devices;
a storage device connectable respectively to the host devices by means of a plurality of communications paths;
a communications status monitoring section which respectively monitors communications statuses between each of said host devices and said storage device;
a failure detecting section which detects whether or not each of a plurality types of prescribed temporary failures, each of which is able to be corrected without switching communications paths, has occurred, on the basis of at least said respective communications statuses detected by said communications status monitoring section, different threshold values of 2 or more being set for said different types of temporary failures respectively;
a switching instruction section which does not output a switching request signal for requesting switching from a failed communications path to a to-be-used communications path before a number of occurrence of at least one type of said prescribed temporary failure detected by said failure detecting section reaches a respective threshold value, and outputs said switching request signal only when and as soon as determining said number of occurrence of said at least one type of said prescribed temporary failure reaches said respective threshold value; and
a path control section which selects the to-be-used communications path, on the basis of said switching request signal from said switching instruction section.

2. The storage system according to claim 1, wherein said host devices share communications ports of said storage device, and said failure detecting section detects whether or not said prescribed temporary failure has occurred with respect to communications ports that are shared by said host devices.

3. The storage system according to claim 1, wherein said prescribed temporary failure include at least a communications time-out status.

4. The storage system according to claim 1, wherein said failure detecting section judges that said prescribed temporary failure has occurred in cases where a prescribed command has been issued by one of said host devices, or cases where a prescribed status has been detected inside said storage device.

5. The storage system according to claim 1, wherein said failure detecting section judges that said prescribed temporary failure has occurred, in cases where at least one of a processing abort command and a reset command has been issued by one of said host devices, or cases where at least one of a communications time-out status and an abnormal status of the communications signal is detected in said storage device.

6. The storage system according to claim 1, wherein said switching instruction section outputs said switching request signal in response to access from one of said host devices.

7. The storage system according to claim 1, wherein said switching instruction section outputs said switching request signal in response to a write or read access from one of said host devices, and does not output said switching request signal in response to a status enquiry access from said one host device.

8. The storage system according to claim 1, wherein said switching request signal is a signal that only affects one of the host devices related to said prescribed temporary failure.

9. The storage system according to claim 1, wherein said switching request signal is a hardware error response.

10. The storage system according to claim 1, wherein said communications status monitoring section, said failure detecting section and said switching instruction section are provided within said storage device, and said path control section is provided within said host device.

11. The storage system according to claim 1, wherein said path control section is provided in a relay device disposed between said host device and said storage device.

12. The storage system according to claim 1, wherein said failure detecting section is provided in either said host device or said relay device.

13. The storage system according to claim 1, wherein threshold values are previously established respectively in association with each type of said prescribed temporary failure, and said switching instruction section detects a number of occurrences respectively for each type of said prescribed temporary failure and outputs said switching request signal, if the number of occurrences for any one prescribed temporary failure of these types has reached a corresponding threshold value.

14. The storage system according to claim 1, wherein, when detecting said switching request signal, said path control section judges whether or not there exists an available communications path, and when judging that an available communications path exists, then said path control section selects that available communications path.

15. The storage system according to claim 1, wherein, when detecting said switching request signal, then said path control section judges whether or not there exists an original communications path from which communications were switched on a previous occasion that said switching request signal was detected, and when judging that there exists an original communications path from which communications were switched due to detection of said switching request signal, then said path control section selects that original communications path.

16. The storage system according to claim 1, wherein said types of temporary failure include an abort request issued by one of said host devices, a reset request issued by one of said host devices, and an abnormality in a communications signal.

17. The storage system according to claim 16, wherein said abnormality in a communications signal includes missing a frame number or error detection information therefrom.

18. A control method for controlling communications paths in a storage system provided with a storage device connectable respectively to a plurality of host devices by means of a plurality of communications paths, in which the communications ports of said storage device can be shared by said respective host devices, comprising:

a monitoring step of respectively monitoring communications statuses between each of said host devices and said storage device;

a failure detecting step of detecting whether or not each of a plurality types of prescribed temporary failures, each of which is to be corrected without switching communications paths, has occurred, on the basis of said respective communications statuses thus detected, different threshold values of 2 or more being set for said different types of temporary failures respectively;

a switching instruction step of not outputting a switching request signal for requesting switching from a failed communications path to a to-be-used communications path before a number of occurrence of at least one type of said prescribed temporary failure detected by said failure detecting section reaches a respective threshold value, and outputting said switching request signal only when and as soon as determining said number of occurrence of said at least one type of said prescribed temporary failure reaches said respective threshold value; and a path selecting step of selecting the to-be-used communications path, from among said plurality of communications paths, on the basis of said switching request signal.

19. The communications path control method for a storage system according to claim 18, wherein, when the access from one of said host devices to said storage device is either a write access or a read access, the step of outputting said switching request signal outputs said switching request signal to said one host device originating said access.

20. The communications path control method for a storage system according to claim 18, wherein a relay device for relaying communications between said respective host devices and said storage device is further provided, and said path selecting step selects said to-be-used communications path either within one of said host devices, or within said relay device.

* * * * *